(12) United States Patent
Gupta et al.

(10) Patent No.: US 11,783,839 B2
(45) Date of Patent: Oct. 10, 2023

(54) ENROLLMENT AND AUTHENTICATION OVER A PHONE CALL IN CALL CENTERS

(71) Applicant: PINDROP SECURITY, INC., Atlanta, GA (US)

(72) Inventors: Payas Gupta, Atlanta, GA (US); Terry Nelms, II, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 75 days.

(21) Appl. No.: 17/491,363

(22) Filed: Sep. 30, 2021

(65) Prior Publication Data

US 2022/0108701 A1 Apr. 7, 2022

Related U.S. Application Data

(60) Provisional application No. 63/086,384, filed on Oct. 1, 2020.

(51) Int. Cl.
| | | |
|---|---|---|
| *G10L 17/04* | (2013.01) | |
| *H04M 3/51* | (2006.01) | |
| *G10L 25/27* | (2013.01) | |
| *H04M 3/22* | (2006.01) | |

(Continued)

(52) U.S. Cl.
CPC .............. *G10L 17/04* (2013.01); *G06F 21/32* (2013.01); *G10L 25/27* (2013.01); *H04M 3/2281* (2013.01); *H04M 3/42068* (2013.01); *H04M 3/51* (2013.01); *H04M 3/5141* (2013.01); *H04M 3/5166* (2013.01); *H04M 2203/6045* (2013.01); *H04M 2203/6054* (2013.01)

(58) Field of Classification Search
None
See application file for complete search history.

(56) References Cited

U.S. PATENT DOCUMENTS

| | | |
|---|---|---|
| 8,539,582 B1 | 9/2013 | Aziz et al. |
| 9,674,214 B2 | 6/2017 | Foster et al. |
| 9,824,692 B1 | 11/2017 | Khoury et al. |

(Continued)

FOREIGN PATENT DOCUMENTS

| | | |
|---|---|---|
| CA | 3064797 | 1/2019 |
| WO | WO-2012/096901 A2 | 7/2012 |

OTHER PUBLICATIONS

International Search Report and Written Opinion for PCT/US2021/052909 dated Feb. 3, 2022 (15 pages).

(Continued)

*Primary Examiner* — Quynh H Nguyen
(74) *Attorney, Agent, or Firm* — FOLEY & LARDNER LLP

(57) ABSTRACT

Embodiments described herein provide for a voice biometrics system execute machine-learning architectures capable of passive, active, continuous, or static operations, or a combination thereof. Systems passively and/or continuously, in some cases in addition to actively and/or statically, enrolling speakers. The system may dynamically generate and update profiles corresponding to end-users who contact a call center. The system may determine a level of enrollment for the enrollee profiles that limits the types of functions that the user may access. The system may update the profiles as new contact events are received or based on certain temporal triggering conditions.

20 Claims, 7 Drawing Sheets

(51) Int. Cl.
*H04M 3/42* (2006.01)
*G06F 21/32* (2013.01)

(56) References Cited

U.S. PATENT DOCUMENTS

| | | |
|---|---|---|
| 9,883,040 B2 | 1/2018 | Strong et al. |
| 9,930,186 B2 | 3/2018 | Bandyopadhyay et al. |
| 10,141,009 B2 | 11/2018 | Khoury et al. |
| 10,325,601 B2 | 6/2019 | Khoury et al. |
| 10,397,398 B2 | 8/2019 | Gupta |
| 10,440,178 B2 | 10/2019 | Gupta et al. |
| 10,490,195 B1 | 11/2019 | Krishnamoorthy et al. |
| 11,019,203 B2 | 5/2021 | Gupta et al. |
| 2005/0071168 A1* | 3/2005 | Juang ............... G10L 17/24 704/E17.011 |
| 2020/0396331 A1 | 12/2020 | Gupta et al. |
| 2021/0058507 A1 | 2/2021 | Cornwell et al. |
| 2021/0241776 A1 | 8/2021 | Sivaraman et al. |
| 2021/0326421 A1 | 10/2021 | Khoury et al. |

OTHER PUBLICATIONS

Invitation to Pay Additional Fees and, Where Applicable, Protest Fee for PCT/US2021/052909 dated Nov. 24, 2021 (3 pages).
International Preliminary Report on Patentability for PCT App. PCT/US2021/052909 dated Mar. 28, 2023 (11 pages).

* cited by examiner

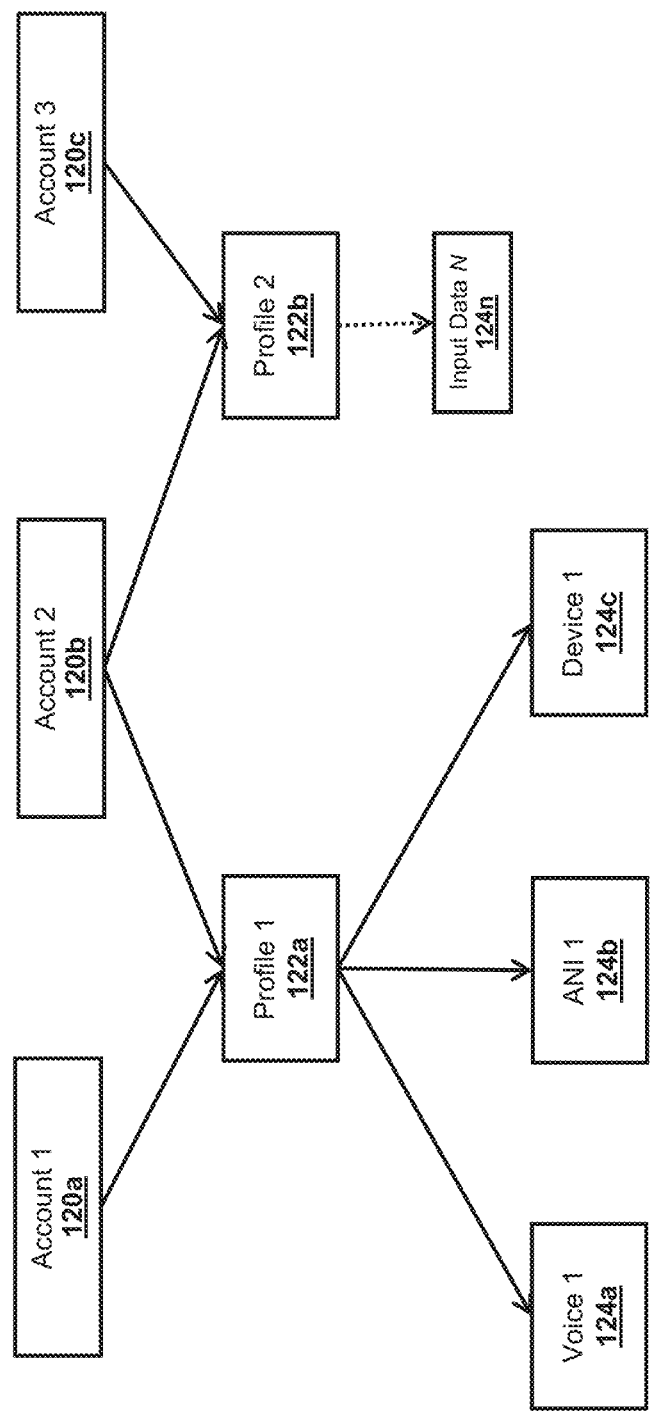

ENROLLMENT AND AUTHENTICATION OVER A PHONE CALL IN CALL CENTERS

CROSS-REFERENCE TO RELATED APPLICATIONS

This application claims priority to U.S. Provisional Application No. 63/086,384, filed Oct. 1, 2020, which is incorporated by reference in its entirety.

This application generally relates to U.S. application Ser. No. 15/294,576, issued as U.S. Pat. No. 9,930,186, entitled "Call Detail Record Analysis to Identify Fraudulent Activity," filed Oct. 14, 2016, which is incorporated by reference in its entirety.

This application generally relates to U.S. application Ser. No. 15/610,378, issued as U.S. Pat. No. 10,141,009, entitled System and Method for Cluster-Based Audio Event Detection," filed May 31, 2017, which is incorporated by reference in its entirety.

This application generally relates to U.S. application Ser. No. 15/262,748, issued as U.S. Pat. No. 9,824,692, entitled "End-to-End Speaker Recognition Using Deep Neural Network," filed Sep. 12, 2016, which is incorporated by reference in its entirety.

This application generally relates to U.S. application Ser. No. 15/294,538, issued as U.S. Pat. No. 9,883,040, entitled "Fraud Detection in Interactive Voice Response Systems," filed Oct. 14, 2016, which is incorporated by reference in its entirety.

This application generally relates to U.S. application Ser. No. 15/709,290, issued as U.S. Pat. No. 10,325,601, entitled "Speaker Recognition in the Call Center," filed Sep. 19, 2017, which is incorporated by reference in its entirety.

This application generally relates to U.S. application Ser. No. 15/872,639, issued as U.S. Pat. No. 10,397,398, entitled "Authentication Using DTMF Tones," filed Jan. 16, 2018, which is incorporated by reference in its entirety.

This application generally relates to U.S. application Ser. No. 16/289,957, issued as U.S. Pat. No. 10,440,178, entitled "Caller ID Verification Using Call Identification and Block Lists," filed Mar. 1, 2019, which is incorporated by reference in its entirety.

This application generally relates to U.S. application Ser. No. 16/287,879, issued as U.S. Pat. No. 11,019,203, entitled "Silent Caller ID Verification Using Callback Request," filed Feb. 27, 2019, which is incorporated by reference in its entirety.

This application generally relates to U.S. application Ser. No. 17/004,921 "Call Authentication at the Call Center Using a Mobile Device," filed Aug. 27, 2020, which is incorporated by reference in its entirety.

This application generally relates to U.S. application Ser. No. 16/992,789, entitled "Caller Verification via Carrier Metadata, filed Aug. 13, 2020, which is incorporated by reference in its entirety.

This application generally relates to U.S. application Ser. No. 17/165,180, entitled "Cross-Channel Enrollment and Authentication of Voice Biometrics," filed Feb. 2, 2021, which is incorporated by reference in its entirety.

This application generally relates to U.S. application Ser. No. 17/231,672, entitled "Passive and Continuous Multi-Speaker Voice Biometrics," filed Apr. 15, 2021, which is incorporated by reference in its entirety.

TECHNICAL FIELD

This application generally relates to systems and methods for authenticating end-users (e.g., callers) who contact a call center or other customer-facing communication channel. In particular, embodiments manage contact profiles for actively or passively enrolling end-users and actively or passively authenticating end-users.

BACKGROUND

Enterprise call centers are typically protected against fraudulent activities through various machine-learning (ML) software that detect various types of fraud. Automatic Speech Recognition (ASR) and Automatic Speaker Verification (ASV) systems are often used for security and authentication features, as well as other voice-based operations. Speaker-independent features of call data can be used to evaluate, for example, the types of devices, the communications channels, the geographic location, and the like. Similarly, call centers employ fraud detection functions evaluating various forms of communications channels, including Internet of Things (IoT) devices for communications via computing networks or telephone calls of various forms, such as landline telephone calls, cellular telephone calls, and Voice-over-IP (VoIP) calls, among others. Fraud detection operations can employ cross-channel fraud risk assessments using data acquired from various different channels.

Conventional fraud detection software adapt to variations in the characteristics of call data indicating fraud. The problem, however, is that many conventional fraud detection functions do not fully account for the dynamic nature of fraudulent activities. The fraud activities are diverse and evolve continually. Nor do the ML models in conventional approaches adapt to the particular business needs. Certain types of fraud events are more impactful and financially damaging than others. Consequently, conventional fraud detection approaches may operate, less-than-optimally, under an assumption that all fraud events must be treated equally.

Call centers or other customer-facing communication channels of enterprises may utilize enrollment and authentication. The enrollment and authentication typically involves some test of the customer-caller's knowledge of personal information or a preset secret. For instance, a call center agent may authenticate a caller on a phone call using Knowledge Based Authentication (KBA) questions. Prior research and case studies have shown that it is easy for a fraudster to bypass or intercept traditional KBAs, such as date of birth, address, mother's maiden name, last four digits of SSN, and the like. Moreover, answering these KBAs at the call center agent increases the Average Handle Time (AHT) and operational costs for the business.

With evolving innovation in authentication requirements, "out of band" techniques via channels aside from the central communication channel have grown more popular. These often include a process of transmitting information or prompt to a user's registered device and evaluating an expected response. There are multiple challenges before a shift from KBAs to risk-based authentication using AI/ML systems for biometrics and other developing techniques.

SUMMARY

Disclosed herein are systems and methods capable of addressing the above-described shortcomings and may also provide any number of additional or alternative benefits and advantages. In particular, embodiments described herein provide for a voice biometrics system executing machine-learning architectures capable of passive, active, continuous, or static enrollment and/or authentication operations. The system may passively and/or continuously, in some cases in addition to actively, enroll speakers as the speakers speak into an end-user device, such as a smartphone or Internet of Things (IoT) edge device. The system may generate profiles for each contact event and identifies users on the fly. The system may manage speaker profiles as speakers provide utterances to the system, which may include managing enrollment levels or confidence levels based on the quality of authentication factors inputted by the end-user or call center agent. Machine-learning architectures may implement a passive and continuous voice biometrics system, possibly without knowledge of speaker identities. The system may create identities in an unsupervised manner, sometimes passively enrolling and recognizing known or unknown speakers. The system may dynamically generate and update profiles corresponding to end-users who contact a call center. The system may determine a level of enrollment for the enrollee profiles that limits the types of functions that the user may access. The system may update the profiles as new contact events are received or based on certain temporal triggering conditions or triggering conditions connected to the results of authentication operations.

In an embodiment, a computer-implemented method comprises receiving, by a computer, from one or more devices, contact data associated with a plurality of contact events; for each contact event of the plurality of contact events, generating, by the computer, a profile for each contact event of the plurality of contact events using a set of features extracted using the contact data, wherein at least one voiceprint based on the set of features is associated with a plurality of profiles; generating, by the computer, a profile similarity score using a first profile for a first contact event and a second profile for a second contact event; responsive to the computer determining that the profile similarity score fails to satisfy a profile similarity threshold: storing, by a computer, the second profile as a new profile using the second set of features.

In another embodiment, a system comprises a database configured to store a plurality of profiles; and a computer comprising a processor configured to: receive from one or more devices, contact data associated with a plurality of contact events; for each contact event of the plurality of contact events, generate a profile for each contact event of the plurality of contact events using a set of features extracted using the contact data, wherein at least one voiceprint based on the set of features is associated with a plurality of profiles; generate a profile similarity score using a first profile for a first contact event and a second profile for a second contact event; and responsive to determining that the profile similarity score fails to satisfy a profile similarity threshold, store the second profile as a new profile using the second set of features.

In another embodiment, a computer-implemented method comprises receiving, by a computer, one or more enrollment inputs for an enrolled speaker, the one or more enrollment inputs comprising an enrollment audio signal and enrollment data; generating, by the computer, an enrolled voiceprint for the enrolled speaker using the one or more enrollment signals and an enrollment level for the enrolled speaker based upon the enrollment data; receiving, by the computer, one or more inbound speaker inputs for an inbound speaker, the one or more inbound speaker inputs comprising an inbound audio signal and inbound contact data; and generating, by the computer, an authentication score for the inbound speaker using the enrollment voiceprint, the enrollment level, and an inbound voiceprint for the inbound speaker based on the inbound audio signal.

In another embodiment, a system comprises a database configured to store a plurality of enrollment inputs; and a computer comprising a processor configured to: receive one or more enrollment inputs for an enrolled speaker, the one or more enrollment inputs comprising an enrollment audio signal and enrollment data; generate an enrolled voiceprint for the enrolled speaker using the one or more enrollment signals and an enrollment level for the enrolled speaker based upon the enrollment data; receive one or more inbound speaker inputs for an inbound speaker, the one or more inbound speaker inputs comprising an inbound audio signal and inbound contact data; and generate an authentication score for the inbound speaker using the enrolled voiceprint, the enrollment level, and an inbound voiceprint for the inbound speaker based on the inbound audio signal.

In another embodiment, a computer-implemented method comprises receiving, by the computer, one or more enrollment inputs for an enrolled speaker; determining, by the computer, an enrollment level based upon one or more characteristics of the enrollment inputs, the one or more characteristics including one or more temporal characteristics associated with the enrollment inputs; generating, by the computer, an enrolled profile for the enrolled speaker according to the enrollment level; receiving, by the computer, one or more inbound inputs for an inbound speaker; determining, by the computer, an authentication level for an inbound speaker using inbound contact data of the one or more inbound inputs; generating, by the computer, an authentication score for an inbound speaker based upon inbound contact inputs, an authentication level, and the enrollment level.

In another embodiment, a system comprises a computer comprising a processor configured to receive one or more enrollment inputs for an enrolled speaker; determine an enrollment level based upon one or more characteristics of the enrollment inputs, the one or more characteristics including one or more temporal characteristics associated with the enrollment inputs; generate an enrolled profile for the enrolled speaker according to the enrollment level; receive one or more inbound inputs for an inbound speaker; determine an authentication level for an inbound speaker using inbound contact data of the one or more inbound inputs; generate an authentication score for an inbound speaker based upon inbound contact inputs, an authentication level, and the enrollment level.

In another embodiment, a computer-implemented method comprises receiving, by a computer, inbound inputs for an inbound speaker via a third-party server, the inbound inputs including an inbound audio signal and inbound authenticating data representing one or more types of authentication factors; generating, by the computer, an authentication score for the inbound speaker using the inbound audio signal and the inbound authenticating data; generating, by the computer, a confidence score for the authentication score based upon the one or more types of authentication factors; in response to determining that the confidence score and the authentication score fail to satisfy at least one threshold: transmitting, by the computer, to the third-party server a message indicating a type of additional authentication factor to satisfy the authentication threshold.

In another embodiment, a computer comprises a processor configured to: receive one or more inbound inputs for an inbound speaker via a third-party server, the inbound inputs including an inbound audio signal and inbound authenticating data representing one or more types of authentication factors; generate an authentication score for the inbound speaker using the inbound audio signal and the inbound authenticating data; generate a confidence score for the authentication score based upon the one or more types of authentication factors; in response to determining that the confidence score and the authentication score fail to satisfy at least one threshold: transmit to the third-party server a message indicating a type of additional authentication factor to satisfy the authentication threshold.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 1C is a diagram showing the data relationships between multiple accounts associated with the enterprise operating the call center system and profiles, according to an embodiment.

DETAILED DESCRIPTION

Figure 1A:
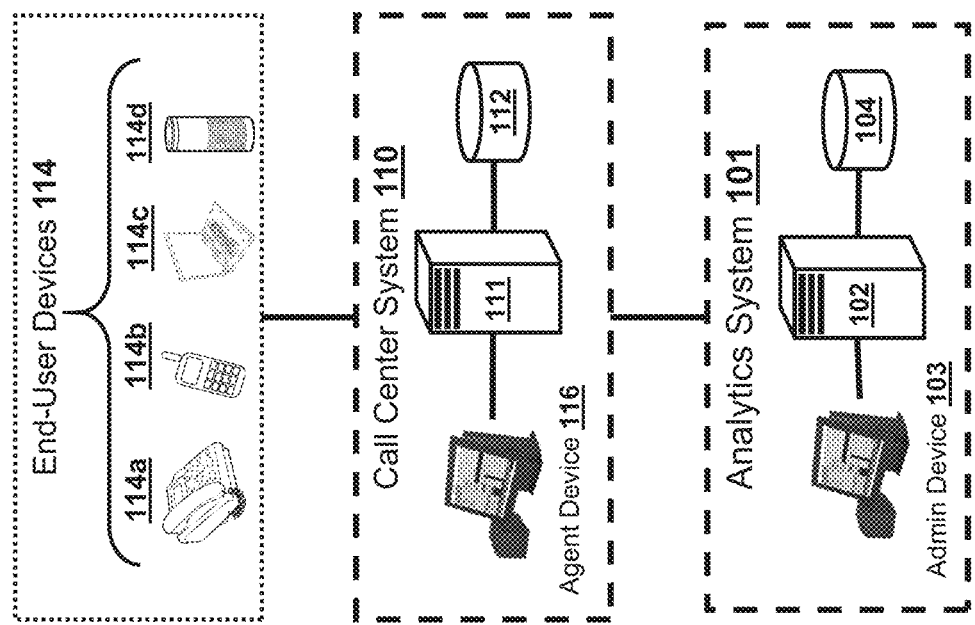
FIG. 1A shows components of a system for receiving and analyzing telephone calls, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing various types of contact data associated with contact events (e.g., phone calls, VoIP calls, remote access, webpage access) for authentication and risk management. The contact data may include audio signals for speakers, software or protocol data, and inputs received from the end-user, among others. The processes described herein manage the types of data accessible to and employed by various machine-learning architectures that extract data from contact events and output authentication or risk threat determinations.

Embodiments described herein actively or passively enroll end-users, and actively or passively authenticate the end-users. The systems receive various types of contact data from end-user devices during contact events (e.g., phone calls). The systems may employ various types of data, include weak and strong KBAs, one-time passwords (OTPs), push notification responses, and AI/ML-generated embedding vectors (e.g., voiceprint, deviceprint, behaviorprint). The KBAs are common and often easy to manage for human users and agents. But KBAs are vulnerable to exploitation and interception and add time to overall servicing, creating inefficiencies. The OTP and push notifications may be secure, but are not always available or easy for end-user to operate. There is a push into the area of risk-based or probability-based authentication to authenticate users via voice biometrics, behavioral biometrics, phone number validation, SIP signaling, and mobile device call back requests. However, there are multiple challenges to accomplish this shift from KBAs to more sophisticated and/or passive risk-based authentication. The embodiments herein may implement any combination of these type of authentication factors.

For a call center authentication over a phone call, there are generally a few operations, including an identity claim evaluation, enrollment, and authentication. In evaluating the identity claim, before authenticating or enrolling any user, the identity of the user has to be known. The identity claim of the user may provided by the user in the interactive voice response (IVR) system or verbally to the agent. The identity claim can be, for example, a social security number (SSN), account number, credit card number, or other identifying data. In some cases, the system may use a user's phone number as an identity claim. For enrollment, after the system receives the identity claim (e.g. SSN), or derives the identity from metadata (e.g. phone number), the system may enroll the user by storing enrollee data and developing models of the AI/ML software. In authentication, after the enrollment, the authentication can be achieved on the first or subsequent calls by comparing various features, such as voiceprints, deviceprints, phone number, and the like, to authenticate the callers on later calls.

FIG. 1A shows components of a system 100 for receiving and analyzing telephone calls. The system 100 comprises a call analytics system 101, call center systems 110 of customer enterprises (e.g., companies, government entities, universities), and end-user devices 114. The analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1A, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1A shows the analytics server 102 as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., provider systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networks, and exchanges, among others.

The end-user devices 114 (sometimes referred to as "caller devices") may be any communications or computing devices that the caller operates to access the services of the call center system 110 through the various communications channels. For instance, the end-user may place the call to the call center system 110 through a telephony network or through a software application executed by the end-user device 114. Non-limiting examples of end-user devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The end-user devices 114, however, are not limited to the telecommunications-oriented devices or channels. For instance, in some cases, the mobile phones 114b may communicate via a computing network channel (e.g., the Internet). The end-user device 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for computing network communications. The edge device 114d could be any smart device capable of executing software applications and/or performing voice interface operations. Non-limiting examples of the edge device 114d may include voice assistant devices, automobiles, smart appliances, and the like.

An analytics service operates the analytics system 102 to perform various call analytics operations on behalf of the enterprise's call center system 110. The analytics operations include, for example, fraud detection and caller authentication. An end user-facing enterprise organization (e.g., corporation, government entity, university) operates the call center system 110 to service calls or web-based interactions with the end users via the various communication channels. The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services.

The call center system 110 comprises various hardware and software components that capture and store various types of contact data (sometimes referred to as "call data" in the example system 100), including audio data or metadata related to the contact event (e.g., call) received at the call center system 110. The data may include, for example, audio data (e.g., audio recording, audio segments, acoustic features), caller information, and metadata (e.g., protocol headers, device identifiers) related to particular software applications (e.g., Skype), programming standards (e.g., codecs), and protocols (e.g., TCP/IP, SIP, SS7) used to execute the call via the particular communication channel (e.g., landline telecommunications, cellular telecommunications, Internet). The call center system 110 is operated by a particular enterprise to offer various services to the enterprise's end-users (e.g., customers, account holders). The call center system 110 includes a call center server 111 or other computing device that executes various operations related managing inbound calls. These operations include receiving or generating various forms of contact data, and transmitting the contact data to the analytics system 101. The analytics server 102 then performs the analytics operations on the contact data.

The analytics server 102 of the call analytics system 101 may be any computing device comprising one or more processors and software, and capable of performing the various processes and tasks described herein. The analytics server 102 may host or be in communication with the analytics database 104, and receives and processes contact data (e.g., audio recordings, metadata) received from the one or more call center systems 110. Although FIG. 1A shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., call center server 111).

The analytics server 102 may authenticate users based on an identity claim, enrollment, and authentication. In the identity claim, the analytics server 102 receives the identity claim for an end-user before the analytics server 102 performs an authentication operation or enrollment operation for the end-user. The end-user may provide the identity claim to an interactive voice responsive (IVR) program of the analytics server 102 or provided verbally to a call center agent. The identity claim may include various types of user information, such as a user identifier or login credentials, social security number (SSN), account number, user phone number or automatic number identifier (ANI), or credit card number, among others. For enrollment, after the analytics server 102 receives the identity claim (e.g., SSN) in a user inputs or derived from metadata (e.g., phone number), the analytics server 102 may enroll or register the end-user with the analytics system 101 or call center system 110. After the analytics server 102 enrolls the end-user, the analytics server 102 performs the authentication operation using the enrolled profile of the user. During an inbound contact event (e.g., telephone call) the analytics server 102 authenticates the end-user at the first or subsequent calls by comparing various enrolled data or features (e.g., voiceprints, device-prints, behaviorprints) to authenticate the callers on the second call or later calls.

The analytics server 102 executes data analysis and audio-processing software that includes machine-learning software routines organized as a machine-learning architecture or model, where the software routines define a machine-learning architecture and models, such as a Gaussian Mixture Matrix (GMM), neural network (e.g., convolutional neural network (CNN), deep neural network (DNN)), and the like. The machine-learning architecture comprises functions or layers that perform the various audio-processing operations discussed herein. The audio-processing operations may include, for example, authentication (e.g., speaker authentication, user authentication), speaker recognition, and user risk detection, among other operations.

The machine-learning architecture ingests and analyzes various types of contact data, which may include inputs received from the end-user device 114 or data or metadata associated with the operations of the end-user device 114. When performing certain operations (e.g., authentication, recognition), the machine-learning architecture may compare expected information against observed information, as received with or generated using the contact data from the end-user device 114. For example, the analytics server 102 may compare an observed phone number for a particular landline telephone 114a or smartphone 114b against an expected phone number to verify the particular landline telephone 114a or smartphone 114b. As another example, the analytics server 102 may compare a KBA response provided by the end-user against a corresponding expected KBA.

In some implementations, the user inputs may include a one-time password (OTP) or a response to a push notification. The analytics server 102 or other device of the system 100 may generate an OTP that the analytics server 102 transmits to the end-user device 114 over a different communication channel or that a call center agent communicates verbally to the end-user. The end-user then inputs the OTP into a user interface of the end-user device 114, and the end-user device 114 transmits the OTP to the analytics server 102 or call center server 111. In some implementations, the user inputs may include a response to a push notification. The analytics server 102 or other device of the system 100 transmits a notification to a software application, phone number, email address, or operating system of the end-user device 114. The notification includes a prompt for display via the user interface of the end-user device 114, prompting the end-user to enter a responsive input. The responsive input indicates that the analytics server 102 transmitted the notification to the correct device identifier or user identifier. Non-limiting example embodiments employing OTPs or push notifications may be found in U.S. Pat. Nos. 10,397,398 and 11,019,203, and U.S. application Ser. No. 17/004,921, each of which is incorporated by reference herein.

The analytics server 102 may extract certain types of features using the contact data from the end-user device 114. Using the extracted features, the machine-learning architecture may extract vectors representing aspects of the end-user (e.g., speaker) or end-user device 114. When authenticating or determining the risk of a particular contact event, the machine-learning architecture may compare expected vectors against observed vectors to generate similarity scores or risk scores. The analytics server 102 authenticates or permits the call when the similarity score (e.g., voiceprint similarity score, deviceprint similarity score) satisfies a recognition threshold or when the risk score satisfies a risk threshold.

For example, the analytics server 102 may receive information related to the user inputs and evaluate the content of the user responses to IVR prompts and/or behavior biometrics identifying the user (e.g., the rate at which the user provides the responses), referred to as a "behaviorprint."

Using this user input information, the analytics server 102 extracts the behaviorprint as a vector representing the user's behavior when interacting with the IVR. Non-limiting examples embodiments of such behaviorprints and a machine-learning architecture configured to generate and process behaviorprints may be found in U.S. Pat. No. 9,883,040 and U.S. application Ser. No. 17/231,672, which are incorporated by reference herein.

As another example, the analytics server 102 may receive device-related data for the end-user device 114, such as a contact channel, a type of end-user device 114, an automatic number identification (ANI), phone number, IP address, MAC address, codec used to transmit audio data, and software executed by the end-user device 114, among others. Using this data, the machine-learning architecture may extract a "deviceprint" that uniquely identifies the particular end-user device 114. The analytics server 102 may extract the deviceprint as a vector representing the particular end-user device 114. Non-limiting examples embodiments of such deviceprints and a machine-learning architecture configured to generate and process deviceprints may be found in U.S. Pat. Nos. 10,325,601 and 11,019,203, and U.S. application Ser. No. 16/992,789, each of which is incorporated by reference herein.

As another example, the analytics server 102 receives the input audio signal, along with the other types of inputted data. The input audio signal may include a speaker's speech signal and, in some cases, various types of noise. The machine-learning architecture extracts and evaluates speaker features as a speaker voice biometric (referred to as a "voiceprint" or "speaker vector") uniquely identifying a particular speaker. The analytics server 102 extracts features from the input audio signal, generates a vector using the extracted features, and extracts the "voiceprint" for the speaker using one or more vectors generated for one or more speaker audio signals. Non-limiting examples embodiments of such voiceprints and a machine-learning architecture configured to generate and process voiceprints may be found in U.S. Pat. Nos. 10,325,601 and 11,019,203, and U.S. application Ser. No. 17/165,180, each of which is incorporated by reference herein.

The machine-learning architecture operates logically in several operational phases, including a training phase, an enrollment phase, and a deployment phase (sometimes referred to as a "test phase" or "testing"). The analytics server 102 receives input contact data corresponding to the particular operational phase of the machine-learning architecture, including training data during the training phase, enrollment data during the enrollment phase, and inbound data during the deployment phase. The analytics server 102 applies certain layers of the machine-learning architecture to the contact data during the corresponding operational phase.

During a training phase, the analytics server 102 receives training data (e.g., training audio signals) or generates various simulated data (e.g., training audio signals), which may include degraded copies of training audio signals. The analytics server 102 applies the layers of the various machine-learning architectures to generate predicted output according to the operational layers of the particular component of the machine-learning architecture. Loss layers or another function of the machine-learning architectures determine a level of error (e.g., one or more similarities, distances) between the predicted output and labels or other data indicating the expected output. The loss layers or another aspect of the machine-learning architecture adjusts the hyper-parameters until the level of error for the predicted outputs (e.g., predicted voiceprint, predicted deviceprint, predicted behaviorprint) satisfy a threshold level or error with respect to expected outputs (e.g., expected voiceprint, expected deviceprint, expected behaviorprint). The analytics server 102 then stores the hyper-parameters, weights, or other terms of the particular machine-learning architecture, thereby "fixing" the particular component of the machine-learning architecture and one or more models.

During an enrollment phase, the analytics server 102 implements an active enrollment operation. An enrollee-speaker, such as an end-consumer of the call center system 110, provides (to the call analytics system 101) bona fide enrollee data (e.g., enrollment audio signals, enrollment device data, enrollment KBAs). For instance, the enrollee could provide responsive inputs to various interactive voice response (IVR) prompts generated by IVR software executed by the call center server 111 via the telephone channel. The responsive inputs could include, for example, credentials (e.g., username, password, passcode) or information for enrollee KBAs. The analytics server 102 applies the various components of the machine-learning architecture to develop models representing the enrollee. For example, the machine-learning architecture extracts one or more enrollee vector embeddings (e.g., enrollee voiceprint, enrollee deviceprint, enrollee behaviorprint) and algorithmically combines the enrollee vector embeddings to generate an enrolled vector embedding (e.g., enrolled voiceprint, enrolled deviceprint, enrolled behaviorprint).

During the deployment phase, the analytics server 102 receives the inbound contact from an inbound caller. The analytics server 102 applies the various components of the machine-learning architecture to extract an inbound vector embedding (e.g., inbound voiceprint, inbound deviceprint, inbound behaviorprint) for the inbound caller, and determine whether the inbound vector embedding is within a threshold of the previously generated enrollee vector embedding by generating one or more similarity scores between the inbound vector embeddings and corresponding enrolled vector embeddings. The analytics server 102 verifies whether the inbound caller is the enrolled caller if the similarity scores satisfy corresponding similarity thresholds.

The analytics server 102 evaluates the one or more similarity scores and similarity thresholds in determining an authentication score. However, as discussed herein, the analytics server 102 may determine the authentication score using additional metric data to, for example, determine the authentication score, calculate a final authentication score, determine authentication or confidence levels, or other potential operations for determining whether the authenticate the inbound caller.

Fraud Risk

In some embodiments, the analytics server 102 generates and evaluates risk scores for authentication operations according to corresponding risk thresholds. The analytics server 102 may generate the risk score based upon a global risk operation and/or local risk operation.

The analytics server 102 determines the global risk using global risk factors. The global risk factors may include, for example, the various types of data collected from contact data across multiple accounts of the call center system 110, such as behavior data associated with a source of multiple inbound contact events (e.g., velocity with which a phone number is calling into the call center system 110 across all the accounts of the enterprise). If the analytics server 102 determines that the behavior data (e.g., velocity) satisfies a threshold, then the analytics server 102 determines the call is risky and/or outputs the particular risk score. In another example, if the analytics server 102 determines that a behaviorprint or other type of data satisfies a similarity score for a known risk feature vector, then the analytics server 102 determines the call is risky and/or outputs the particular risk score.

The analytics server 102 determines the local risk using local risk factors. The local risk factors may include, for example, the various types of data collected from contact data within an account, such as relative similarities or distances between local enrolled features for an enrolled profile associated with the account compared to the features extracted for a new inbound call associated with the particular account. As another example, the confidence level determined for a speaker's signal or resulting embedding vector (i.e., voiceprint) based upon certain factors or degradation (e.g., total speech, noise) can also contribute to the local risk. If the analytics server 102 determines that the similarity score or the distance satisfies a dissimilarity threshold, then the analytics server 102 may determine the inbound call is risky and/or outputs the particular risk score. In some implementations, the analytics server 102 is pre-configured to determine that the local risk score is zero for calls associated with an unenrolled account (i.e., no profile exists for the account).

Generating Profiles, Actions on the Profiles, Passive Enrollment

In some embodiments, the analytics server 102 implements a passive enrollment operation. When implementing passive enrollment, the machine-learning architecture may identify and enroll new enrollee-users on the fly, in which the analytics server 102 automatically captures certain enrollment data to enroll newly distinguished enrollee-users without requiring active interactions from the particular enrollee-user. In some implementations, the machine-learning architecture performs continuous passive enrollment operations in which the analytics server 102 may capture and re-evaluate enrollment data on an ongoing basis, such that the analytics server 102 continuously updates the information for enrolled users. Non-limiting example embodiments of passive and continuous enrollment may be found in U.S. application Ser. No. 17/231,672, which is incorporated by reference herein.

For passive enrollment operations, the analytics system 101 may generate, store, and maintain one or more profiles (or personas) over time for a particular end-user, where each end-user is associated with one or more accounts of the call center system 110 (e.g., bank account and credit card account of a bank). As the end-user may be associated with one or more personas over time, an account may be associated with one or more end-users. Profiles are the unit element for each account. A profile includes, for example, various types of data, information, or features about the end-user (e.g., identifiers, name, accounts, KBAs, identity claim) or end-user device 114 (e.g., phone number) used to initiate a contact event (e.g., phone call) or used when enrolling the end-user with the analytics system 101 or call center system 110. The profile further includes one or more feature vectors with user-centric features rather than account centric features.

The profiles need not be enrolled profiles, and may be stored into non-transitory machine-readable storage location that function as a temporary or buffer memory location for further operations. The analytics server 102 may actively enroll the profile as an enrolled profile during an active enrollment operation or passively after the analytics server 102 receives a certain type or amount of information during contact events or when executing the authentication operations. The information in the profile may include the various types of data about the end-user or the end-user device 114 for a given contact event, including the user information (e.g., KBAs, credentials, identity claim), device-related information (e.g., phone number, ANI, MAC address, IP address, software, codec), deviceprints, voiceprints, and behaviorprints. In some implementation, profiles may further include a level of enrollment indicating a quality or confidence associated with the enrollment data and the level of access permitted.

Figure 1B:
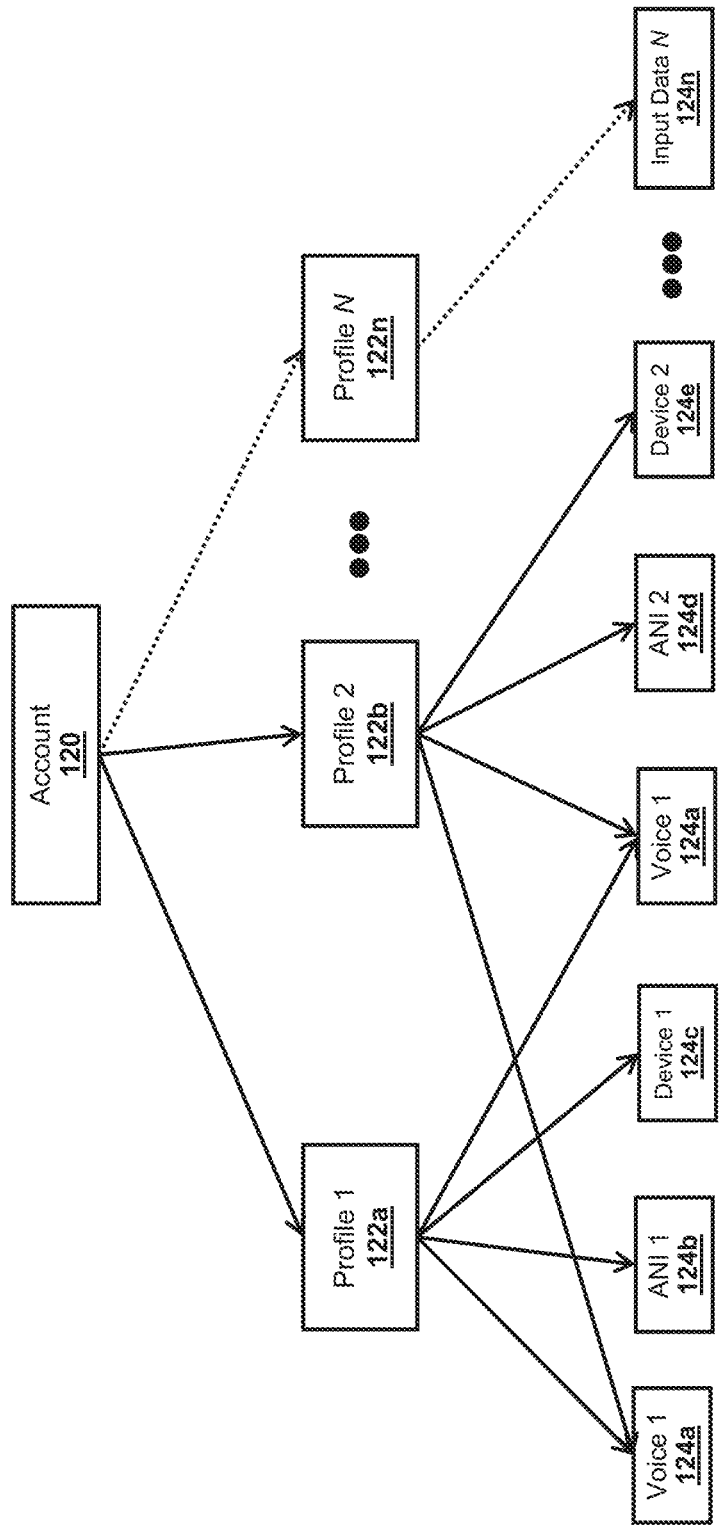
FIG. 1B is a diagram showing data relationships between an account associated with the enterprise operating the call center system, and any number of profiles representing end-user contacts, according to an embodiment.

As an example, FIG. 1B is a diagram showing data relationships between an account 120 associated with the enterprise operating the call center system 110, and any number of profiles 122a-122n (referred to as profile(s) 122) representing end-users or other aspects of contact events based upon contact data or enrollment data, including Profile_1 122a and Profile_2 122b. The analytics server 102 generates each profile 122 using various types of data 124a-124n (sometimes referred to as contact data 124), such as voice data (e.g., voice_1 124a), ANIs (e.g., ANI_1 124b, ANI_2 124d), or device data (e.g., device_1 124c, device_2 124d). The voice data may include, for example, speaker features or speaker voiceprints. The device data may include, for example, a deviceprint or other device-related information.

The profiles 122 may, for example, represent different speakers or the same speaker, and/or represent the same end-user device 114 or different end-user devices 114. In the example shown in FIG. 1B, Profile_1 122a and Profile_2 122b represent the same speaker who contacted the call center system 110 using different end-user devices 114. The analytics server 102 generates Profile_1 122a for a first inbound call using the contact data received via landline phone 114a and Profile_2 122b for a second inbound call using the contact data received via a smartphone 114b. Profile_1 122a and Profile_2 122b each include the same or similar voiceprint (e.g., Voice_1 124a), but also include different ANIs (e.g., ANI_1 124b, ANI_2 124d) and different deviceprints (e.g., Device_1 124c, Device_2 124d).

As another example, FIG. 1C is a diagram showing the data relationships between multiple accounts 120 (e.g., Account_1 120a, Account_2 120b, Account_3 120c) associated with the enterprise operating the call center system 110, and profiles 122 (e.g., Profile_1 122a, Profile_2 122b). For instance, a husband and wife may have a joint account (e.g., Account_2 120b) and distinct individual accounts (e.g., Account_1 120a, Account_3 120c). The analytics server 102 may generate the wife's profile (e.g., Profile_1 120a) for the wife's individual account (e.g., Account_1 120a) during an active enrollment session, and later associate Profile_1 122a with the joint account (e.g., Account_2 120b). The analytics server 102 may generate the husband's profile (e.g., Profile_2 122b) for the husband's individual account (e.g., Account_3 120c) during an active enrollment session, and later associate Profile_2 122b with the joint account (e.g., Account_2 120b).

The analytics server 102 may perform any number of actions on the profiles, such as merging profiles, splitting profiles, or deleting profiles, over time using various features extracted from subsequent inbound contact data or other triggering conditions. The analytics server 102 may perform the operations on the profiles in real-time as new inbound contact data is received, at a preconfigured interval (e.g., daily, weekly), or in response to preconfigured triggering condition.

The analytics server 102 may create a profile 122. To generate a profile 122, the analytics server 102 may determine whether any profiles 122 are already associated with a user account 120. To determine whether there is an existing profile 122, the analytics server 102 compares one or more feature vectors of the inbound profile 122 to match against feature vectors of existing profiles 122 and determining one or more similarity scores or distances between the features of the inbound profile 122 and the existing profiles 122. If the one or more similarity scores fail one or more similarity thresholds, then the analytics server 102 creates the new profile 122. When the analytics server 102 determines that there are no profiles 122 associated with the user account 120, then the analytics server 102 can use contact data and features (e.g., phone number, voiceprints) to create the new profile 122 and store the new profile 122 into the analytics database 104 or call center database 112.

As an example, with reference to FIG. 1B, the analytics server 102 previously generated Profile_1 122a that is stored in the analytics database 104. When the analytics server 102 receives a new inbound call, the analytics server 102 determines the new inbound call is associated with the account 120 according to an identity claim or other information received in the new contact data. Using the contact data of the new inbound call, the analytics server 102 identifies an inbound ANI (ANI_2 124d), and generates an inbound voiceprint (Voice_1 124a) and inbound deviceprint (Device_2 124e). The analytics server 102 determines that an enrolled or existing voiceprint (Voice_1 124a) of Profile_1 122a matches to the inbound voiceprint (Voice_1 124a), but determines that an existing ANI (ANI_1 124b) and an existing deviceprint (Device_1 124c) of Profile_1 122a fail to match to the inbound ANI (ANI_2 124d) and the inbound deviceprint (Device_2 124e) of the new inbound call. As such, the analytics server 102 generates Profile_2 122b representing the new inbound call.

The analytics server 102 may merge a profile 122. If, for example, the analytics server 102 determines an inbound profile 122 satisfies one or more threshold similarities with the existing profile 122, then the analytics server 102 merges the profiles 122 into a single profile 122. The analytics server 102 compares various data of the inbound profile against the existing profile and generates the similarity scores or other types of data based upon comparing the profiles. The analytics server 102 may generate a profile similarity score or the one or more similarity scores to determine whether the profiles match in accordance with a profile similarity threshold or the one or more threshold similarities corresponding to the similarity scores.

The analytics server 102 may split a profile. The analytics server 102 may split the profile 122 into one or more profiles 122 over time. The analytics server 102 may split the profile 122 if, for example, the analytics server 102 evaluates additional or alternative features, which may change one or more similarity scores between contact events associated with the profile 122. As another example, the analytics server 102 may split the profile 122 if administrators of the analytics system 101 adjust the weights or parameters assigned to the underlying features or feature vectors, which may cause the analytics server 102 to generate different feature vectors for each of the contact events associated with profile and/or different similarity scores.

The analytics server 102 may delete a profile. The analytics server 102 may delete the profile 122 based upon, for example, preconfigured triggering criteria (e.g., temporal age expiration, temporal lack of use) or when the analytics server 102 generates or enrolls the profile 122 inaccurately. In some cases, the analytics server 102 deletes the profile 122 when the end-user submits updated information (e.g., device information, voice samples, end-user information) that affirmatively deprecates corresponding information in the existing profile 122.

The analytics server 102 may link a profile. In some cases, the analytics server 102 generates a new profile 122 independent from any account 120. The analytics server 102 may later link (or associate) the new profile 122 to one or more accounts 120. The analytics server 102 may link the profile based on one or more triggering conditions or in response to a feedback instruction received from another device (e.g., admin device 103, end-user device 114, agent device 116).

The analytics server 102 may unlink a profile. In some cases, the analytics server 102 unlinks a profile 122 from a particular account 120, but the analytics server 102 does not delete the profile 122. The analytics server 102 may link the profile 122 to a different account 120 at a later time. The analytics server 102 may unlink the profile based on one or more triggering conditions or in response to a feedback instruction received from another device (e.g., admin device 103, end-user device 114, agent device 116).

Profile States

The profiles stored in the analytics database 104 include a profile state, which may be updated or adjusted automatically by the analytics server 102 or manually by a user of the system 100 (e.g., end-user, agent, administrator). For instance, a profile may be automatically moved from "inactive" to "active" based on whether the profile has been verified and enrolled as an enrolled profile.

The profile status may be an "active" profile for authentication operations. An active profile may be an enrolled profile, though not in all embodiments. The active profile may any profile that the analytics server 102 references to authenticate an end-user during inbound contact events.

The profile status may be an "inactive" profile when the analytics server 102 does not, or no longer, references the profile to authenticate a caller during inbound calls. For example, the analytics server 102 may determine the profile status is inactive in response to receiving new device information or new voice information, or in response to a time-based triggering condition (e.g., voice of profile has aged, profile usage has aged, profile expired).

The profile status may be a "quarantine" status when the analytics server 102 stores the profile into a temporary storage memory location (sometimes called a "buffer" or "quarantine"). The analytics server 102 does not reference the profile when performing authentication operations or use the profile to update existing enrolled profiles until the analytics server 102 receives further data about the particular profile. If the analytics server 102 identifies one or more triggering conditions associated with the quarantined profile, then the analytics server 102 moves the profile out of quarantine, such as a temporal characteristic or successful authentication of the quarantined profile, among others. The analytics server 102 may update the status of the profile to "active" and begins using the profile for authentication, or the analytics server 102 may update the status of the profile to "fraud" or "inactive."

The profile status may be a "fraud" status. The analytics server 102 or other device of the system 100 (e.g., admin device 103, agent device 116) indicates the profile is fraud or failed a threshold number of authentication attempts. In some implementations, the analytics server 102 references the fraud profile during authentication operations to determine the risk score. The fraud profile is beneficial for configuring the analytics server 102 to detect fraud affirmatively, rather than simply determining an authentication score. For example, the analytics server 102 may generate the one or more similarity scores or compare other types of data in the fraud profile against later inbound contact data to generate the risk score as indicating the likelihood of fraud on the inbound call.

Enrollment Levels and Authentication or Confidence Levels

When passively or actively enrolling an end-user, the analytics server 102 receives or extracts various forms of identifying enrollee information. For instance, the call center server 111 or analytics server 102 may receive and store identifying or secret information (e.g., ANI of end-user device 114, address of end-user device 114, enrolled voiceprint, enrolled deviceprint, enrollee's KBA information) submitted by the end-user during an active enrollment process, when the end-user registers with the analytics system 101 or call center system 110. Each type of enrollment information has a corresponding level of confidence or enrollment level, according to known and preconfigured confidence values. The analytics server 102 determines an enrollment level for the enrolled profile based upon the types of enrollment information. During a later operation (e.g., authentication operation, passive enrollment update operation), the analytics server 102 references the enrollment level to determine whether to proceed with the later operation.

The enrollment information and authentication information (sometimes called "authentication factors") have preconfigured confidence levels based upon data categories. The category indicates the confidence level for the particular piece of information. The categories may include, for example, weak KBAs, strong KBAs, prompt responses (e.g., OTP, push notification), and embedding vectors (e.g., voiceprints, deviceprints, behaviorprints). The analytics server 102 determines the enrollment level or authentication level based upon the confidence levels associated with the categories. As an example, if the analytics server 102 enrolled an end-user using three weak KBAs, then the analytics server 102 determines that the enrollee has an enrollment level of Level 1, thereby permitting the end-user to perform low-level operations (e.g., check account balance). Similarly, if the analytics server 102 successfully authenticated the end-user to perform the low-level operation using three weak KBAs, then the analytics server 102 passively enrolls the end-user at the enrollment level of Level 1. In later authentication operations, the analytics server 102 may authenticate the enrollee-user for Level 1 operations, using the same three weak KBAs or other combination of information having a combined level of Level 1. Conversely, the analytics server 102 will never authenticate the enrollee-user for an authentication operation at Level 2 (e.g., ANI change) or above, because the enrollee's enrollment level is only at Level 1.

As another example, the analytics server 102 actively or passively enrolls the enrollee-user at an enrollment level of Level 2 (e.g., ANI change) using three weak KBAs and two strong KBAs. In later authentication operations, the analytics server 102 may authenticate the enrollee-user for Level 1 operations (e.g., check account balance) or Level 2 operations, using the same three weak KBAs and two strong KBAs or other combination of information having a combined level of Level 1 or Level 2 respectively. Conversely, the analytics server 102 will never authenticate the enrollee-user for an operation at Level 3 (e.g., wire transaction) or above, because the enrollee's enrollment level is only at Level 2.

Similar to enrollment operations, the analytics server 102 actively or passively authenticates the end-user at different authentication levels using the inbound contact data. In operation, the analytics server 102 generates the authentication score using the inbound contact data and determines the confidence level (e.g., authentication, enrollment level) based upon the types or categories of the inbound contact data. The analytics server 102 may generate a final authentication score based upon the authentication score and the authentication level, and determines whether the final authentication score satisfies an authentication threshold and enrollment level. The final authentication score may be represented as Final_auth_score=f(enrollment level, call_auth_score). For instance, if the enrollment level is low and the call authentication score is high, then the analytics server 102 will determine that the final authentication score will satisfy the authentication threshold for the low enrollment level.

In some embodiments, a confidence level for the authentication score is based upon a false acceptance rate (FAR), defined as a percentage of the number of fraud calls successfully authenticated over total fraud calls. The final authentication score may be a function of the FAR. For example, Final_auth_confidence=f(FAR). The confidence level may be a separate a threshold value that the analytics server 102 compares against preconfigured confidence values mapped to the various types of data received with an inbound call or with an enrollment.

In some embodiments, the analytics server 102 determines the final authentication decision based upon, for example, end-user credentials stored for the end-user in the account and the risk score. The analytics server 102 computes the risk score using one or more fraud risk scores (e.g., global fraud risk, local fraud risk). In some cases, the analytics server 102 may assign different weights to the global fraud risk or local fraud risk. In such embodiments, the final authentication score is represented as Final_auth_score=f(call_risk, call_auth_score). If the analytics server 102 generates a relatively higher risk score for the inbound call, then the analytics server 102 may generate a prompt for the end-user device 114 or agent device 116 that requests the end-user to provide one or more KBAs. If, on the other hand, the analytics server 102 generates a relatively lower risk score using the inbound call, then the analytics server 102 may require fewer KBAs or none.

In some embodiments, the final authentication score is based upon on any combination of the above-discussed functions for determining the final authentication score. For example, the administrator may configured to analytics server 102 to employ a target confidence level of 100%. The analytics server 102 generates a first authentication score (X) based upon multiple features (e.g., voiceprints, deviceprints, ANIs) of the inbound contact data and a first confidence rate of 75%. The remaining 25% must be achieved using second authentication operation to output a second authentication score (Y). For example, the remaining second authentication score (Y) may be generated by asking the end-user to enter one or more KBAs or by transmitting to the end-user device 114 a prompt for the end-user to enter an OTP or a response to a push notification. Non-limiting examples of producing such authentication scores based on multiple features and/or sending an OTP can be found in U.S. Pat. Nos. 10,141,009, 9,824,692, 10,325,601, and 10,397,398, and U.S. application Ser. No. 17/004,921 [PIN0142-US], which are incorporated by reference herein.

Recommendation Engine

As mentioned above, the goal is to authenticate every user with utmost confidence (100%), but passive authentication may be unable to authenticate an end-user with sufficient confidence; the confidence level may not be 100%. In some circumstances, such as non-critical operations, a less-than-perfect (<100%) confidence is acceptable. For example, the analytics server 102 may authenticate an inbound end-user when the authentication confidence of 95% is acceptable to check an account balance.

In some embodiments, the analytics server 102 generates one or more authentication recommendations when the final authentication score, authentication score, and/or the confidence level fails to satisfy a corresponding threshold. For example, if the authentication confidence is only 70%, yet the target confidence needs to be 95%, then the analytics server 102 may determine the one or more authentication recommendations to authenticate the user with the desired confidence level. The analytics server 102 may generate a recommendation message containing the authentication recommendations indicating one or more additional authentication factors for satisfying a threshold for the final authentication score, authentication score, and/or the confidence level. The analytics server 102 transmits the recommendation message to the agent device 116 or end-user device 114 for display or playback via a user interface.

The analytics server 102 contains preconfigured mappings between the types of authentication factors and corresponding factor weights, which the analytics server 102 references to determine the authentication factors (e.g., strong KBAs, weak KBAs, OTPs, embedding vectors) needed to satisfy one or more authentication thresholds. As shown in Table 1 (below), the preconfigured mappings indicate the weighting value assigned to the existing authentication factors (e.g., weak KBAs, strong KBAs, OTPs), which are the types of data used by the call center system 110 or analytics system 101 for authentication operations.

As an example, the call center agent may ask the caller for responses to three weak KBAs (wKBAs) for a desired low-level of authentication (e.g., Level 1), and asks for an OTP to authenticate at a comparatively higher level of authentication (e.g., Level 2), where Level 2 requires two-factor authentication (e.g., three wKBAs+OTP). As shown in Table 1, the analytics server 102 is configured to map the three wKBAs=x and the OTP=x, where x represents the strength of the authentication factor. As another example, if the user was asked only two strong KBAs (sKBAs), rather than three weak KBAs, the analytics server 102 is configured to map 2 sKBAs=x. Based on such mappings, the analytics server 102 may determine the level of confidence of any combination of factors.

TABLE 1

| Authentication Factor(s) | Weight of Factor(s) |
| --- | --- |
| 3 weak KBAs | x |
| 2 strong KBAs | x |
| OTP | x |
| 1 sKBA + 2 wKBAs | 1.16x |

TABLE 1-continued

| Authentication Factor(s) | Weight of Factor(s) |
|---|---|
| 1 wKBA + OTP | 1.33x |
| 1 sKBA + 2 wKBAs | 1.5x |
| 1 sKBA + OTP | 1.5x |
| 1 wKBA + 1 sKBA + OTP | 1.83x |
| 3 wKBAs + 2 sKBAs | 2x |
| 3 wKBAs + OTP | 2x |
| 2 sKBAs + 3wKBAs + OTP | 3x |

The analytics server 102 may employs additional or alternative authentications factors (e.g., voiceprints, deviceprints) to knowledge-based authentication factors (e.g., weak KBAs, strong KBAs, OTP). The analytics server 102 may include mappings that indicate the confidence weights of voiceprint=x and deviceprint=x. To have a confidence level strength of greater than or equal to the existing authentication factors, the admin device 103 may replace the mappings of the analytics server 102, such that three weak KBAs are equivalent to the voiceprint (3 wKBAs=voiceprint=x) and the OTP is equivalent to the deviceprint (OTP=deviceprint=x). Other examples of updated mappings include 3 wKBAs+2 sKBAs+voiceprint=2x, and 1 sKBA+3 wKBAs=1.5x. In some embodiments, an ensemble model for the machine-learning architecture may generate an authentication using the voice and device to generate the authentication score to have strength of 1.5x (0.75 voice+0.75 device=1.5x).

Temporal Characteristics

The contact event data received from the end-user device 114 includes timestamps that the analytics server 102 may reference in determining temporal characteristics associated with the profile that analytics server 102 generated for the particular contact event. Non-limiting examples may include the amount of time since the most recent call for that profile and the amount of time since the first call for that profile.

The analytics server 102 may reference the temporal characteristics when performing certain operations, such as determining the authentication or confidence level of the profile, or for performing certain preconfigured actions in response to certain temporal triggering conditions. For example, the analytics server 102 may increase or decrease the enrollment level of a certain enrolled profile due to the frequency (or infrequency) of certain events, or the analytics server 102 may automatically update the status of the profile to "inactive" due to a prolonged lapse in time since the profile was last referenced.

In some embodiments, the analytics server 102 uses the temporal characteristics factor for determining whether to enroll the profile for a certain inbound contact event with an account, which may include updating an enrolled profile, generating a new enrolled profile, or linking the profile with the account. For example, the analytics server 102 may enroll the profile for the inbound contact event after a threshold amount of time (e.g., 5 days) since the most recent contact, if the analytics server 102 or agent device 116 did not otherwise indicate that authentication failed or that fraud detected on the account.

Additionally or alternatively, the analytics server 102 may update the enrollment level of the enrolled profile over time. For example, during a first call to the for a user account, if the analytics server 102 determines that the risk level for the end-user and/or the requested operation is low, then the analytics server 102 generates a new enrolled profile for the enrollee-user at Level 1 of the enrollment levels. If a second call occurs after some time (at $T_1$), and the analytics server 102 did not reject authentication attempts or detect fraud on the account, then the analytics server 102 may increase the enrollment level for that enrolled profile or the account to Level 2. If a third call occurs after some time (at $T_2$), and the analytics server 102 did not reject authentication attempts or detect fraud on the account, then the analytics server 102 may increase the enrollment level for that enrolled profile or the account to Level 3, and so on.

In some implementations, a time period (e.g., $T_1$, $T_2$) is a dynamic window that the analytics server 102 increases or decreases based upon, for example, risk level associated with inbound contact events (e.g., calls) or the frequency of calls attempting to access the account (e.g., velocity of calls).

The analytics server 102 may employ the temporal characteristics along with other data to consider whether to enroll or otherwise perform an action on a given profile. For example, the analytics server 102 may generate a voiceprint for the inbound call to employ voice biometrics and measure the confidence level on the inbound call. If the analytics server 102 would have rendered a particular enrolled profile "inactive" due to prolonged inactivity, but the similarity score between the inbound voiceprint and an enrolled voiceprint indicates the current caller is the enrollee, then the analytics server 102 continues with the authentication operation and/or enrollment operation, overriding or postponing the temporal trigger.

Analytics Database 104 and Call Center Database 112

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS). The analytics database 104 and/or the call center database 112 contains any number of corpora of training call data (e.g., training audio signals, training metadata) that are accessible to the analytics server 102 via the one or more networks. In some embodiments, the analytics server 102 employs supervised training to train the models of the machine-learning architecture, where the analytics database 104 and/or the call center database 112 contains labels associated with the training call data or enrollment call data. The labels indicate, for example, the expected data for the training call data or enrollment call data. The analytics server 102 may also query an external database (not shown) to access a third-party corpus of training call data. An administrator may configure the analytics server 102 to select the training call data having various types of speaker-independent characteristics or metadata. The analytics database 104 stores the configuration inputs received from the agent device 116 that configure operational parameters of the fraud importance engine, as well as trained models, caller enrollment and registration information, and other types of information managing the functions of the analytics server 102.

The analytics database 104 or call center database 112 further stores the profiles for end-users, such as temporarily generated profiles or enrolled profiles, as generated or updated by the analytics server 102. In storing the profiles, the analytics database 104 or call center database 112 store the profile states and the various types of data received or derived from the end-user devices 114 used to generate or update the profiles. The analytics database 104 may further store timestamps and temporal characteristics, as identified or generated by the analytics server 102.

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of call data (e.g., audio data, audio recording, speaker-independent characteristics, metadata, speaker inputs) about the call, the caller, and/or the end-user device 114 and forward the call data to the agent device 116, where an agent UI of the agent device 116 displays the call data to the call center agent.

The call center server 111 also transmits the call data to the call analytics system 101 to preform the various analytics processes on the call data of the inbound call or any prior call. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

The admin device 103 of the analytics system 101 is a computing device allowing personnel of the analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 or provider system 110 and to issue queries and instructions to such components. In the example system 100, the agent device 116 configures the operations of the fraud importance engine and provides fraud detection feedback, though in some implementations, the admin device 103 performs one or more of these functions.

The agent device 116 of the call center system 110 may allow agents or other users of the call center system 110 to configure operations of devices of the call center system 110. For calls made to the call center system 110, the agent device 116 receives and displays via the agent user interface some or all of the information associated with inbound call data, routed from the call center server 111 or from the analytics server 102. The agent user interface further permits the agent to provide feedback (e.g., authentication feedback, fraud detection feedback) to the analytics server 102 and configure the operations of the analytics server 102 or other components of the system.

When performing an authentication or fraud detection operation, the agent user interface presents the agent a list of authentication or fraud determinations for current or prior calls. The agent inputs whether the particular call involved fraud or should have been authenticated, which sometimes contradict and correct a previous determination made by the analytics server 102. The analytics server 102 uses this feedback for retraining or tuning the machine-learning architecture models and updating the profiles or other data. The authentication feedback is an indication to the analytics server 102 to either enroll or reject a current or prior call from enrolling. The call center agent operates the agent device 116 to provide enrollment instructions by providing positive or negative feedback. The positive feedback instructs the analytics server 102 to enroll the user or the caller device 114. In the case where the call center agent provides negative feedback for the analytics server 102 to not enroll that call in the user account, then the analytics server 102 will not enroll the call for that user account.

Enrollment and Authentication Operations

Figure 2:
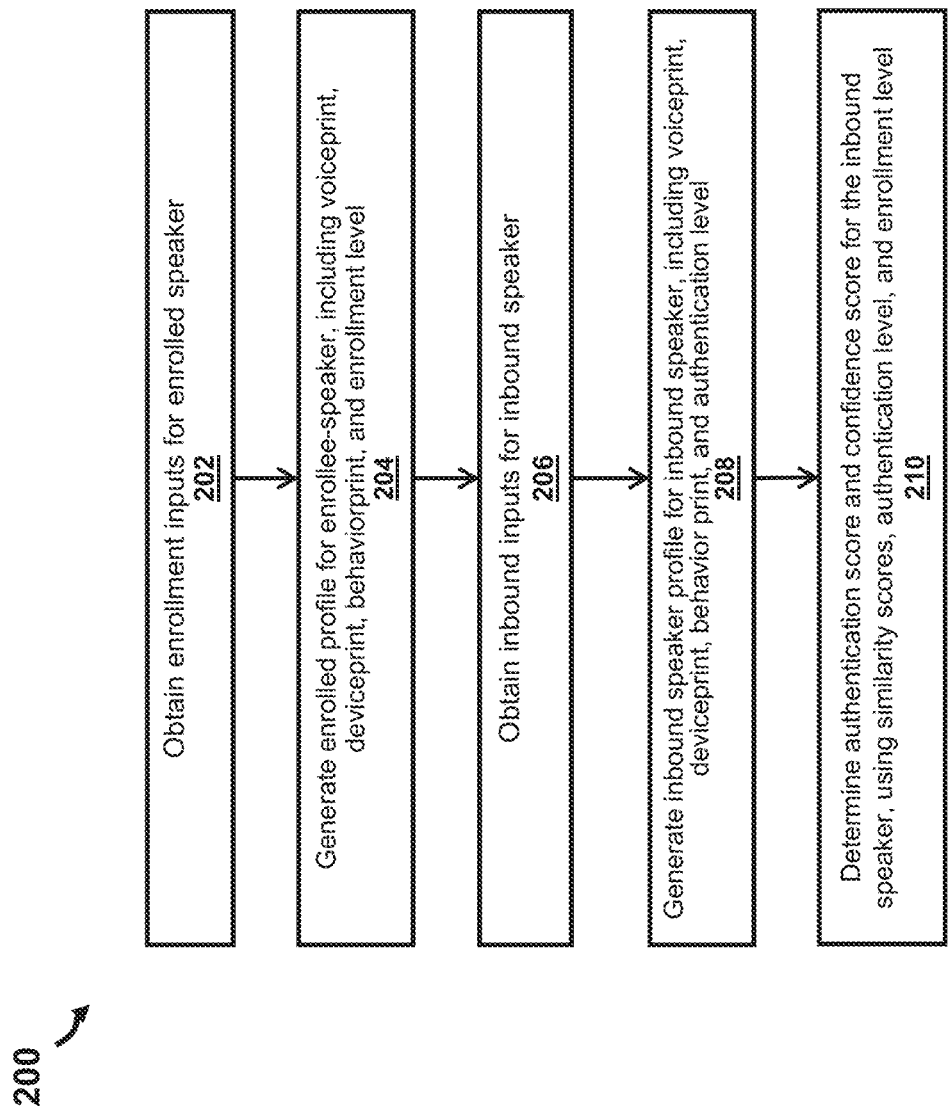
FIG. 2 shows execution steps of a method for audio-processing using a machine-learning architecture, according to an embodiment.

FIG. 2 shows execution steps of a method 200 for audio-processing using a machine-learning architecture. Embodiments may include additional, fewer, or different operations than those described in the method 200. The method 200 is performed by a server executing machine-readable software code associated with the machine-learning architecture, though any number of computing devices and processors may perform the various operations described here.

In step 202, the server obtains one or more enrollment inputs including enrollment data for an enrollee-speaker. The enrollment inputs include various types of data, including data provided by the end-user via inputs to the IVR, utterances spoken by the end-user, responses to notification prompts entered by the end-user, responses to agent questions provided by the end-user, or any other type of data received from the end-user. The server may obtain the enrollment inputs passively or through an active enrollment process when the agent or notification prompts instruct the enrollee-user to provide at least some of the enrollment inputs. In passive enrollment, the server may receive and store the enrollment inputs as a new profile in a buffer storage location until the server identifies one or more enrollment triggering conditions to convert the new profile to an enrolled profile (as in step 204). In some cases, the server receives the enrollment inputs passively as inbound authentication inputs during an authentication operation (in steps 206-210).

In step 204, the server generates an enrolled profile for the enrollee using at least some of the data received in the enrollment inputs. The machine-learning architecture of the server extracts one or more feature vectors for the enrollment data based upon the features extracted from the enrollment data, and then the server algorithmically combines the feature vectors to generate the one or more enrolled embedding vectors. The enrolled profile may include, for example, various types of device or software related data (e.g., ANIs, IP address, MAC address, codec), user-related data (e.g., name, credentials, password, username), the enrolled embedding vectors (e.g., enrolled voiceprint, enrolled deviceprint, enrolled behaviorprint), and an enrollment level for the enrolled profile, among other types of data.

The server determines an enrollment level for the enrolled profile based upon the types of data the server used to generate the enrolled profile. The enrollment level indicates to the server which information or features that the enrollee-user may access via the enrolled profile. The server references the enrollment level as one of the authentication thresholds. In some cases, the server determines the enrollment level based upon preconfigured values mapped to each type of enrollment data or authentication data. In some cases, the enrollment level is increased or decreased based upon certain data or preconfigured conditions, such as one or more temporal characteristics or a number of successful or failed authentication attempts.

In step 206, the server obtains one or more inbound inputs for an inbound speaker during the authentication operation, including the inbound authentication data for the inbound speaker. The inbound inputs include the various types of data, including data provided by the end-user via inputs to the IVR, utterances spoken by the end-user, responses to notification prompts entered by the end-user, responses to agent questions provided by the end-user, or any other type of data received from the end-user. The server may obtain the inbound authentication inputs passively or through an active authentication process when the agent or notification prompts instruct the end-user to provide at least some of the inbound inputs.

In step 208, the server generates an inbound profile for the inbound end-user. The machine-learning architecture of the server extracts one or more feature vectors for the inbound authentication data based upon the features extracted from the inbound data, and then the server algorithmically combines the feature vectors to generate the one or more inbound embedding vectors. The inbound profile may include, for example, the various types of device or software related data (e.g., ANIs, IP address, MAC address, codec), user-related data (e.g., name, credentials, password, username), the inbound embedding vectors (e.g., inbound voiceprint, inbound deviceprint, inbound behaviorprint), and an authentication or confidence level for the inbound profile, among other types of data.

In step 210, the server performs an authentication operation by determining an authentication score and confidence score for the inbound contact event. The server determines whether to authenticate the inbound end-user using, for example, the inbound data, the enrollment data, one or more similarity scores, a risk score, an authentication level, and/or an enrollment level, among other potential metrics. The server authenticates the inbound end-user by comparing the inbound data in the inbound profile against the enrolled data of one or more enrolled profiles.

The server may identify the enrolled profile based upon user-related data received in the inbound data, which may include an identity claim (e.g., username, credentials, name of user, account information). The identity claim indicates the account and the one or more profiles purportedly associated with the end-user who is seeking certain information or attempting to perform certain operations associated with a service provider (e.g., call center). For instance, the server may compare an inbound ANI received in the inbound data against an enrolled ANI to determine whether the enrolled end-user device (e.g., smartphone, landline phone) and an inbound end-user device have the same ANI. The server may generate the one or more similarity scores based upon the similarities or distances between the one or more enrolled embeddings and the corresponding inbound embeddings. The server generates an authentication score based upon the data comparisons or the similarity scores.

In some implementations, the server may generate an inbound authentication level for the inbound profile based upon the types of data used to generate inbound profile. The server compares the authentication level against the enrollment level of the enrolled profile, which the server treats as an authentication threshold. For instance, the server will reject the authentication if the server determines that the authentication level fails to satisfy the enrollment level.

In some implementations, the server may generate a final authentication score based upon the authentication score and one or more function outputs, such as an enrollment level, the authentication level, a confidence level, or other values.

The server may perform one or more operations on the profiles, such as the enrolled profile or inbound profile, based upon the results of the authentication operation or other preconfigured configuration. In some cases, the server updates a status of the profile based upon the authentication results. For instance, the server may update a profile's status from "active" to "fraud" or "quarantine" in response to determining that the data of the profile fails to satisfy one or more authentication thresholds or that the data of the profile satisfies one or more fraud risk thresholds. In some cases, the server performs an action on the profile based upon the data of the profile or inputs from an admin device 103 or agent device 116, such as merging the profile with an existing profile or linking the profile with the account.

Figure 3A:
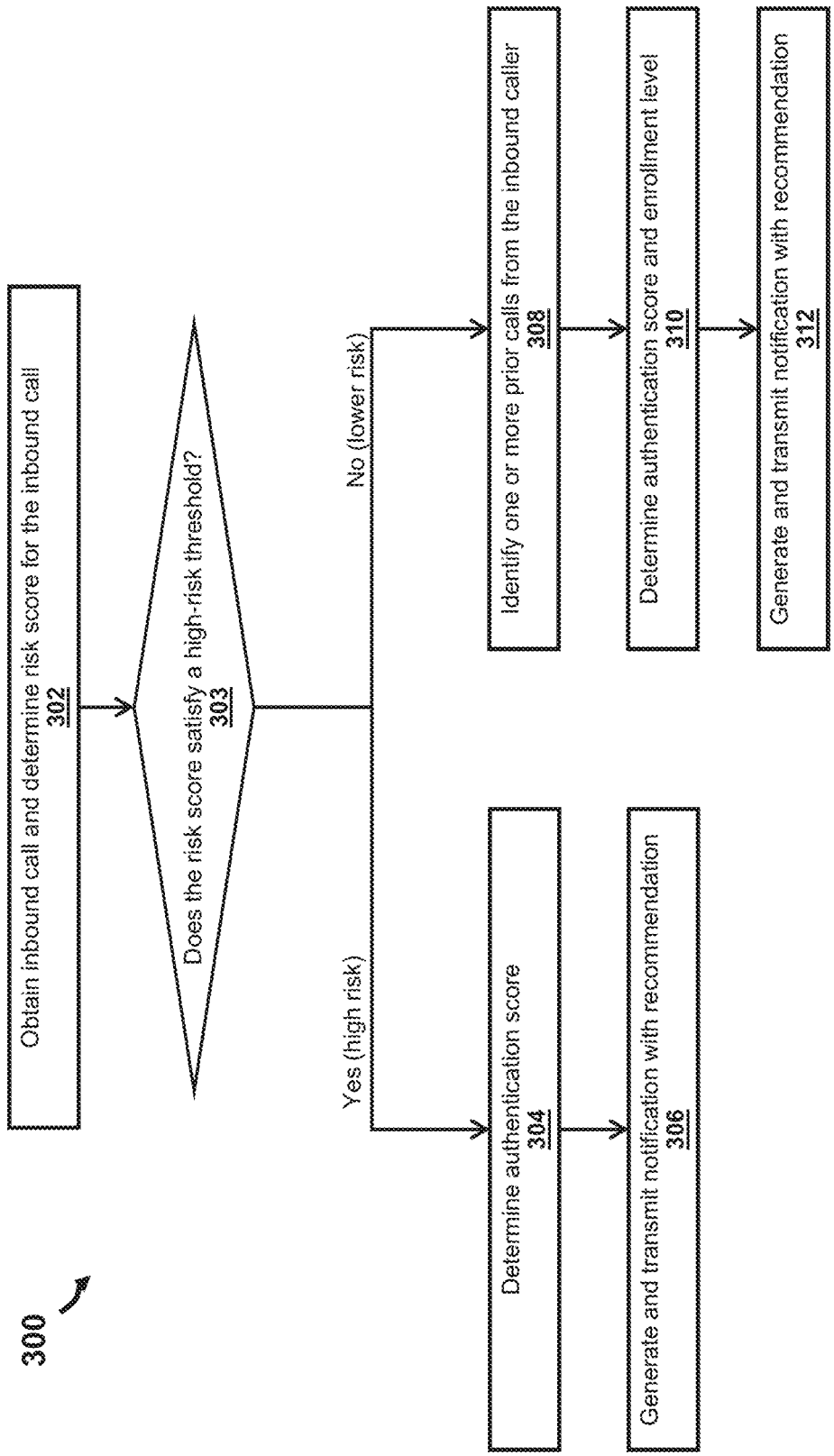
FIGS. 3A and 3B show execution steps of a method for authentication operations using a machine-learning architecture using time and risk factors for enrollment and authentication, according to an embodiment.
Figure 3B:
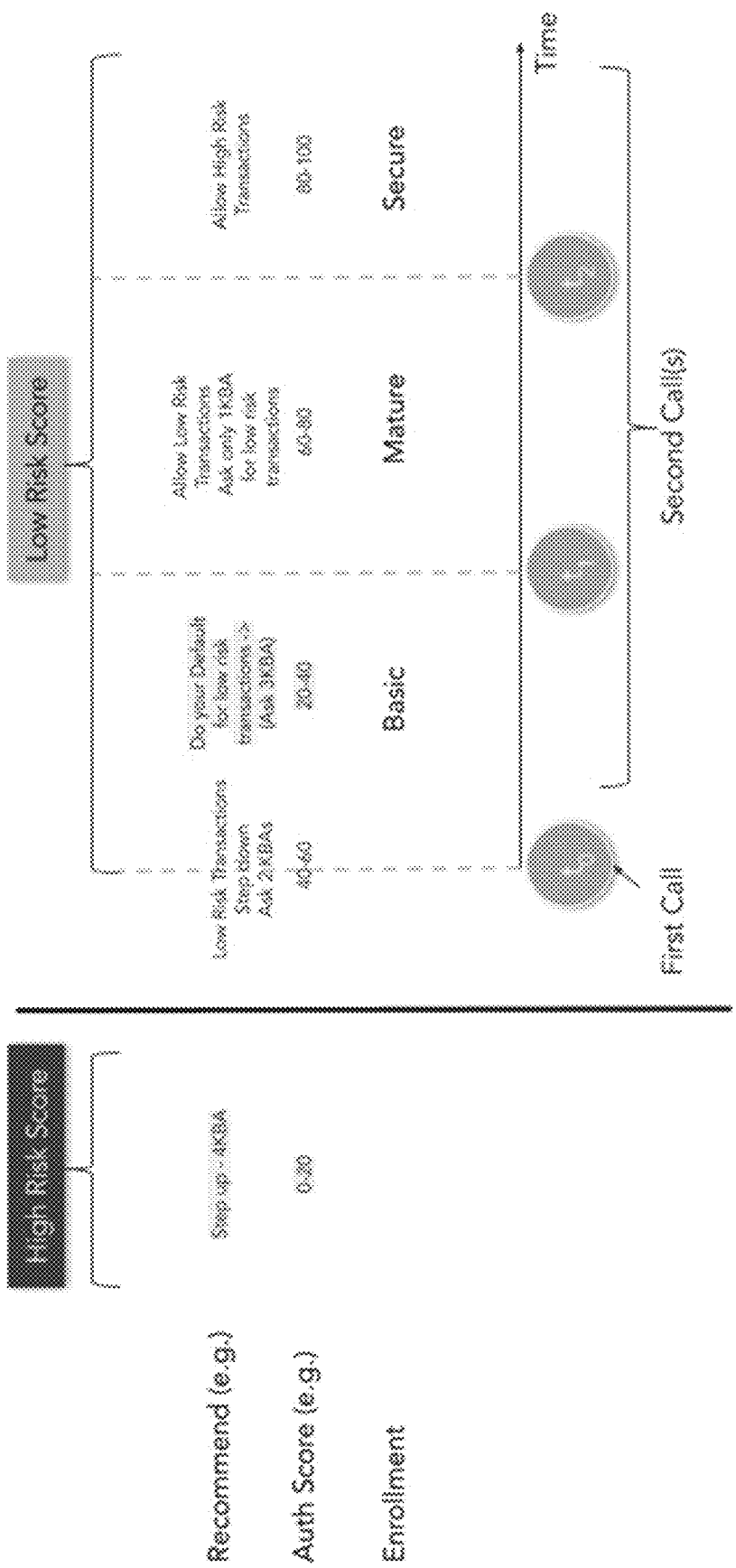

FIGS. 3A and 3B show execution steps of a method 300 for authentication operations using a machine-learning architecture using time and risk factors for enrollment and authentication. Embodiments may include additional, fewer, or different operations than those described in the method 300. The method 300 is performed by a server executing machine-readable software code associated with the machine-learning architecture, though any number of computing devices and processors may perform the various operations described here.

In step 302, the server obtains data for an inbound call and determines a risk score for the inbound call. In determination step 303, the server determines whether the risk score satisfies a preconfigured high-risk threshold. The server determines the risk score based upon the local risk score, the global risk score, or one or more additional operations for determining a level of risk associated with the inbound call and an operation requested by the inbound caller. The server then determines whether the risk score satisfies a risk threshold.

In step 304, the server generates an authentication score for the inbound call according to an elevated or "stepped up" authentication operation, when the server determines (in step 303) that the risk score represents a higher level of risk that satisfies the high-risk threshold. In the stepped up authentication, the server may, for example, decrease the authentication level and/or the authentication score, or increase authentication score threshold. For instance, because the risk score is relatively high, the server generates a relatively low authentication score (e.g., 0-20 on an example scale of 0-100). In some implementations, the server is preconfigured to avoid enrolling the data of inbound calls having high-risk scores.

In step 306, the server generates and transmits a notification indicating one or more elevated recommendations for additional authentication factors. For example, the server by default generates a recommendation for three KBAs, but in the elevated authentication requirements, the server generates a recommendation for four KBAs.

In step 308, the server identifies one or more prior calls from the inbound caller in one or more databases, when the server determines (in step 303) that the risk score represents a comparatively lower risk that fails to satisfy the high-risk threshold. The server proceeds with authentication or enrollment operations, though the server may perform authentication or enrollment operations (in steps 310-312) based upon the number of prior calls received from the particular inbound caller.

In step 310, the server determines the authentication score and enrollment level for the inbound call data. If the server determines (in step 308) that the current inbound call is a first call associated with a particular user account (at time $T_0$), then the server may generate a moderate authentication score (e.g., 40-60 of 100) based solely upon the risk score. The server may further assign a "Basic" or "Level 1" enrollment level to the newly enrolled profile.

However, if the server determines (in step 308) that the current inbound calls is a second or subsequent call occurring within a shorter timeframe from the first call (e.g., between times $T_0$ and $T_1$), then server maintains the Basic enrollment level, but the server generates a comparatively lower authentication score (e.g., 20-40 of 100). In this configuration, the server generates the lower authentication score to reflect the behavior of fraudsters to make frequent calls associated with the account within a short period of time.

If the server determines (in step 308) that the current inbound call is a second or subsequent call occurring at a comparatively longer timeframe from the first call (e.g., between $T_1$ and $T_2$), then the server may upgrade and update the enrollment level to "Mature" or "Level 2." The server may also generate a comparatively higher authentication score (e.g., 60-80 of 100), as computed by the server based upon the lower risk score, the higher enrollment level, and one or more inbound embeddings (e.g., voiceprint, deviceprint, behaviorprint) having a similarity score within a similarity threshold with respect to corresponding enrolled embeddings, such that the inbound embeddings and enrolled embeddings closely match with one another.

Similarly, if the second or subsequent inbound calls occur at the longer timeframe (between $T_1$ and $T_2$), then the server may upgrade the enrollment level "Secure" or "Level 3." The server may also determine a relatively high authentication score for such inbound calls (e.g., 80-100). The server computes the authentication score based upon the relatively lower risk score, the high enrollment level, and one or more matched embeddings between the inbound embeddings and the enrolled embeddings.

The times ($T_1$, $T_2$) or time windows may be fixed and preconfigured in the server according to administrative user configurations. In some embodiments, the server determines the times or time windows dynamically.

In step 312, the server generates and transmits a notification indicating one or more recommendations for a required number and/or category of authentication factors. The server may transmit the notification to the end-user device or the agent device for display or playback to the end-user or agent. In some embodiments, the notification may instruct software of the end-user device to gather and transmit to the server certain types of inbound authentication data as the additional authentication factors.

The notification prompts the agent or end-user to input or provide certain types of additional inbound authentication data (e.g., KBAs, OTPs, response to push notification, data for generating an embedding vector) for authenticating or enrolling the end-user. The server determines the recommendation based upon, for example, the authentication score, risk score, authentication level, confidence level, and/or enrollment level. As an example, when the authentication score is moderate (e.g., 40-60 of 100) and based solely on the risk score, then the server determines a recommendation may remain at the default authentication requirements (e.g., agents requests three weak KBAs from end-user).

The recommendation need not require additional authentication factors. In some cases, the server may determine a recommendation for fewer or less sophisticated authentication factors. As an example, when the authentication score is relatively high (e.g., 60-80 of 100), then the server determines the recommendation may include lowering or stepping down the authentication requirements (e.g., agents requests only 1 KBA from the end-user). As another example, when the server determines the authentication is high, then the server determines that no further authentication factors are required and that authentication may proceed using the data already received for the inbound data. In this example, the recommendation would be to step down and forgo the authentication factors (e.g., agent requests 0 KBAs).

Example Recommendation Engine Operations for a Call Center System

Figure 4:
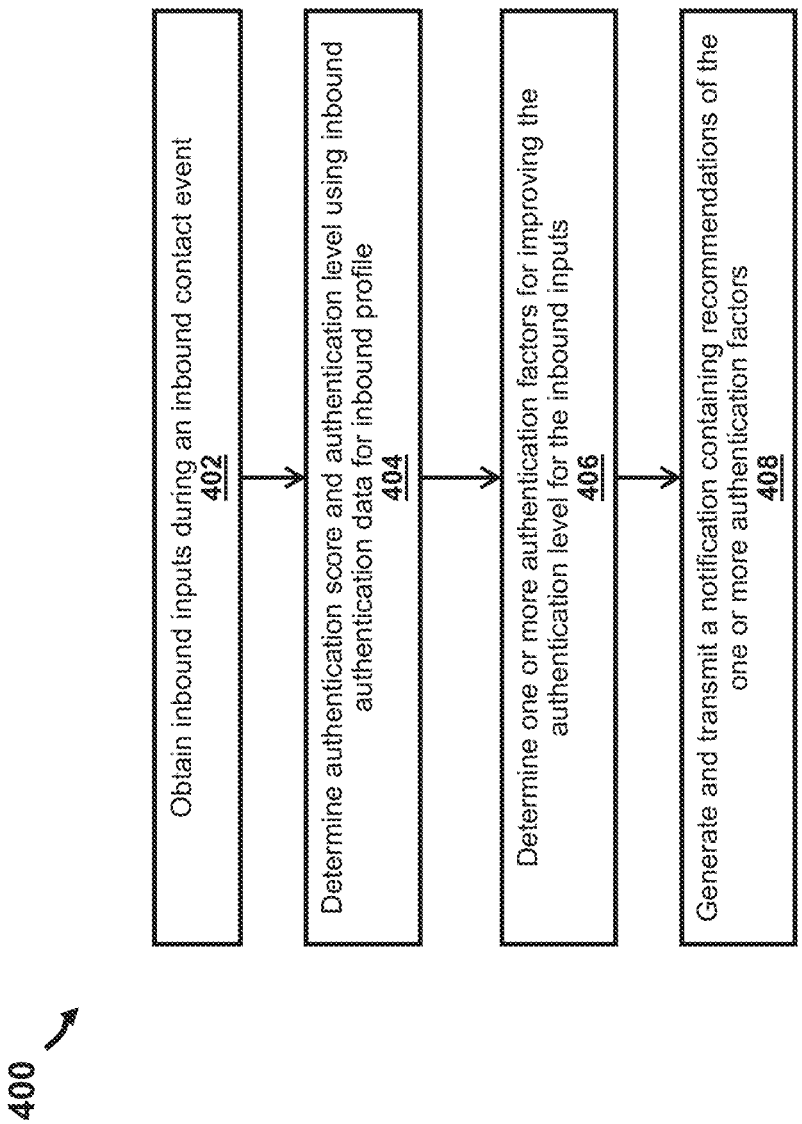
FIG. 4 shows execution steps of a method for authentication operations using a machine-learning architecture and authentication levels for recommending certain authentication factors, according to an embodiment.

FIG. 4 shows execution steps of a method 400 for authentication operations using a machine-learning architecture and authentication levels for recommending certain authentication factors. Embodiments may include additional, fewer, or different operations than those described in the method 400. The method 400 is performed by a server executing machine-readable software code associated with the machine-learning architecture, though any number of computing devices and processors may perform the various operations described here.

In step 402, the server obtains inbound inputs during an inbound contact event, where the inbound inputs include various types of data for generating an inbound profile as discussed above. The inbound inputs include the various types of data, including data provided by the end-user via inputs to the IVR, utterances spoken by the end-user, responses to notification prompts entered by the end-user, responses to agent questions provided by the end-user, or any other type of data received from the end-user.

In step 404, the server determines an authentication score and authentication level for the inbound profile using the inbound data received with the inbound inputs. The server compares certain portions of the inbound data of the inbound profile against corresponding data in an existing profile, which may include the enrolled profile. For example, the server may generate the authentication score based upon one or more similarity scores generated using embedding vectors (e.g., enrolled voiceprint, inbound voiceprint, enrolled deviceprint, inbound voiceprint), one or more KBAs received from the end-user, or other types of data.

The inbound inputs further indicate a type of operation (e.g., check account, wire transfer) requested by an inbound end-user. The requested operation is associated with a required authentication level. The authentication level required for the operation may be relative to the quality of enrollment data used to generate an enrolled profile and/or relative to the potential harm that could result from exploiting the requested operation. In some cases, the server generates an authentication level as a confidence score based upon the quality of inbound data. The server may require a higher confidence score for high-risk operations as compared to other, lower risk operations. For example, the confidence level for a wire transfer may require a maximum (e.g., 100%) confidence level when authenticating the inbound user, but require a comparatively lower confidence score (e.g., 90%) to authenticate the inbound user when performing an account status check.

In the example method 400, the inbound inputs include only a combination of weak KBAs, which the server uses to generate the authentication score, and authentication level or confidence level. The server determines that the authentication score for the weak KBAs were accurate and satisfy one or more similarity thresholds, but the server determines that the authentication or confidence level fail to satisfy an authentication level threshold or that a final authentication fails to satisfy a final authentication threshold. In some embodiments, however, the server may determine that the inbound inputs successfully authenticate the inbound user.

In step 406, the server determines one or more authentication factors (or types of authentication data) for improving the authentication score or authentication level for the inbound end-user. The server references preconfigured mappings indicating a quality or level of confidence assigned to categories of authentication factors (e.g., weak KBAs, strong KBAs, OTP, similarity scores from embedding vectors). The server identifies the extant authentication factors received with the inbound inputs, and then references the mappings to calculate or otherwise determine one or more additional authentication factors that would successfully authenticate the inbound end-user for the requested operation.

In step 408, the server generates and transmits a notification containing one or more recommendations indicating the one or more authentication factors recommended for authenticating the inbound end-user for the requested operation. The server generates the notification for display or playback at a user interface component of the end-user device or an agent device. The notification instructs the end-user to provide, or instructs the agent to request, additional inbound authentication inputs containing the additional factors, such as weak KBAs, strong KBAs, a response to an OTP prompt, a spoken utterance, other form of data or information that may be used for authentication.

As an example, the server transmits the notification to the end-user device, such as a smartphone, and the notification presents instructions for the end-user to provide responses to for two strong KBAs or to speak an utterance presented on the device screen. As another example, the server transmits the notification to the agent device instructing the agent who is on the phone with the end-user to request the end-user to provide two strong KBAs or speak the utterance. In some implementations, the server, software of the end-user device, or the agent may verify the accuracy of the additional inbound inputs by referencing enrolled data of the corresponding enrolled profile. Additionally or alternatively, the server updates the authentication score, authentication level, and/or the confidence level based upon the additional inbound inputs containing the additional authentication factors. The server then determines whether the values that the server generated using the both the initial and additional inputs satisfy the authentication score threshold and/or the confidence level threshold.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by the computer from a call center server, one or more enrollment inputs for an enrolled speaker, the one or more enrollment inputs including enrollment call metadata;
determining, by the computer, an enrollment level based upon one or more characteristics of the enrollment inputs including the enrollment call metadata, the one or more characteristics including one or more temporal characteristics associated with the enrollment inputs;
generating, by the computer, an enrolled profile for the enrolled speaker according to the enrollment level and based on the one or more characteristics;
receiving, by the computer from the call center server, one or more inbound inputs for an inbound speaker, the one or more inbound inputs including inbound call metadata;
determining, by the computer, an authentication level for the inbound speaker using inbound contact data of the one or more inbound inputs including the inbound call metadata;
generating, by the computer, an authentication score for the inbound speaker based upon the inbound contact data inputs, the authentication level, and the enrollment level; and
transmitting, by the computer to the call center server, a message for authenticating the inbound call based upon the authentication score.

2. The method according to claim 1, wherein the temporal characteristic includes at least one of a time since the most recent call, a time of a first call, and an elapsed time since the first call.

3. The method according to claim 1, further comprising:
determining, by the computer, that the enrollment level fails to satisfy an enrollment level threshold,
wherein the computer generates the enrolled profile as a quarantine enrollment in temporary storage location.

4. The method according to claim 1, further comprising updating, by the computer, the enrolled profile in response to the computer detecting one or more triggering conditions in the enrollment inputs.

5. The method according to claim 4, wherein updating the enrolled profile includes:
determining, by the computer, that a temporal characteristic in the enrollment inputs satisfies a preconfigured temporal condition.

6. The method according to claim 1, further comprising updating, by the computer, the enrolled profile in response to the computer detecting one or more triggering conditions from the inbound contact data.

7. The method according to claim 6, wherein updating the enrolled profile includes:
updating, by the computer, the enrollment level of the enrolled profile in response to determining that a temporal characteristic of the inbound contact data satisfies a preconfigured temporal condition.

8. The method according to claim 1, further comprising:
determining, by the computer, a dynamic timeframe for the account enrollment based upon a frequency of calls associated with the account enrollment; and
determining, by the computer, that a temporal characteristic of the inbound contact data satisfies a preconfigured temporal condition based upon the dynamic timeframe.

9. The method according to claim 1, further comprising:
extracting, by the computer, an enrollment voiceprint using the enrollment inputs;
extracting, by the computer, an inbound voiceprint using the inbound contact data; and
generating, by the computer, a speaker similarity score using the inbound voiceprint and the enrollment voiceprint, wherein the authentication score for the inbound speaker is further based upon the speaker similarity score.

10. The method according to claim 1, further comprising:
extracting, by the computer, an enrollment deviceprint using the enrollment data;
extracting, by the computer, an inbound deviceprint using the inbound contact data; and
generating, by the computer, a device similarity score using the inbound deviceprint and the enrollment deviceprint, wherein the authentication score is further based upon the device similarity score.

11. A system comprising:
a computer comprising a processor configured to:
receive one or more enrollment inputs for an enrolled speaker from a call center server, the one or more enrollment inputs including enrollment call metadata;
determine an enrollment level based upon one or more characteristics of the enrollment inputs including the enrollment call metadata, the one or more characteristics including one or more temporal characteristics associated with the enrollment inputs;
generate an enrolled profile for the enrolled speaker according to the enrollment level and based on the one or more characteristics;
receive one or more inbound inputs for an inbound speaker from the call center server, the one or more inbound inputs including inbound call metadata;
determine an authentication level for the inbound speaker using inbound contact data of the one or more inbound inputs including the inbound call metadata;
generate an authentication score for the inbound speaker based upon the inbound contact data, the authentication level, and the enrollment level; and
transmit, to the call center server, a message for authenticating the inbound call based upon the authentication score.

12. The system according to claim 11, wherein the temporal characteristic includes at least one of a time since the most recent call, a time of a first call, and an elapsed time since the first call.

13. The system according to claim 11, wherein the computer is further configured to:
determine that the enrollment level fails to satisfy an enrollment level threshold,
wherein the computer generates the enrolled profile as a quarantine enrollment in temporary storage location.

14. The system according to claim 11, wherein the computer is further configured to:
update the enrolled profile in response to the computer detecting one or more triggering conditions in the enrollment inputs.

15. The system according to claim 14, wherein when updating the enrolled profile the computer is further configured to:
determining, by the computer, that a temporal characteristic in the enrollment inputs satisfies a preconfigured temporal condition.

16. The system according to claim 11, wherein the computer is further configured to:

update the enrolled profile in response to the computer detecting one or more triggering conditions from the inbound contact data.

17. The system according to claim 16, wherein when updating the enrolled profile the computer is further configured to:

update the enrollment level of the enrolled profile in response to determining that a temporal characteristic of the inbound contact data satisfies a preconfigured temporal condition.

18. The system according to claim 11, wherein the computer is further configured to:

determine a dynamic timeframe for the account enrollment based upon a frequency of calls associated with the account enrollment; and determine that a temporal characteristic of the inbound contact data satisfies a preconfigured temporal condition based upon the dynamic timeframe.

19. The system according to claim 11, wherein the computer is further configured to:

extract an enrollment voiceprint using the enrollment inputs;

extract an inbound voiceprint using the inbound contact data; and generate a speaker similarity score using the inbound voiceprint and the enrollment voiceprint, wherein the authentication score for the inbound speaker is further based upon the speaker similarity score.

20. The system according to claim 11, wherein the computer is further configured to:

extract an enrollment deviceprint using the enrollment data;

extract an inbound deviceprint using the inbound contact data; and generate a device similarity score using the inbound deviceprint and the enrollment deviceprint, wherein the authentication score is further based upon the device similarity score.

\* \* \* \* \*